United States Patent [19]
Huber

[11] Patent Number: 5,984,828
[45] Date of Patent: Nov. 16, 1999

[54] CONTROL METHODS FOR A SHIFT BY WIRE VEHICLE TRANSMISSION

[75] Inventor: Jon M. Huber, Laurinburg, N.C.

[73] Assignee: Meritor Heavy Vehicle Systems, LLC, Troy, Mich.

[21] Appl. No.: 09/039,692

[22] Filed: Mar. 16, 1998

[51] Int. Cl.[6] ................................................. B60K 41/24
[52] U.S. Cl. .............................. 477/78; 477/142; 701/64
[58] Field of Search ............................... 477/142, 75, 78, 477/134; 701/64, 51, 52, 61

[56] References Cited

U.S. PATENT DOCUMENTS

| | | | |
|---|---|---|---|
| 5,406,862 | 4/1995 | Amsallen | 477/901 X |
| 5,527,237 | 6/1996 | Fowler et al. | 477/78 X |
| 5,741,202 | 4/1998 | Huber | 477/110 X |
| 5,761,628 | 6/1998 | Steeby et al. | 477/78 X |
| 5,830,104 | 11/1998 | Desautels et al. | 477/109 |
| 5,875,410 | 2/1999 | Fowler et al. | 701/64 |

*Primary Examiner*—Dirk Wright
*Assistant Examiner*—Peter T. Kwon
*Attorney, Agent, or Firm*—Howard & Howard

[57] ABSTRACT

A shift by wire vehicle transmission includes control methods for engaging gears after the vehicle has been at rest or coasting. When the vehicle is started from a stop or rest, a default starting gear is automatically selected. The driver can override the default gear and choose to start driving the vehicle in one gear above or below the default starting gear by manipulating a shift lever. Similarly, the driver can override the default starting gear to begin driving the vehicle in reverse. When the vehicle has been coasting, the transmission control unit chooses the next gear based upon a signal that is provided when the driver manipulates the shift lever. Depending on the indicated desire of the driver, the system controller automatically selects a gear depending upon vehicle speed and torque conditions.

19 Claims, 1 Drawing Sheet

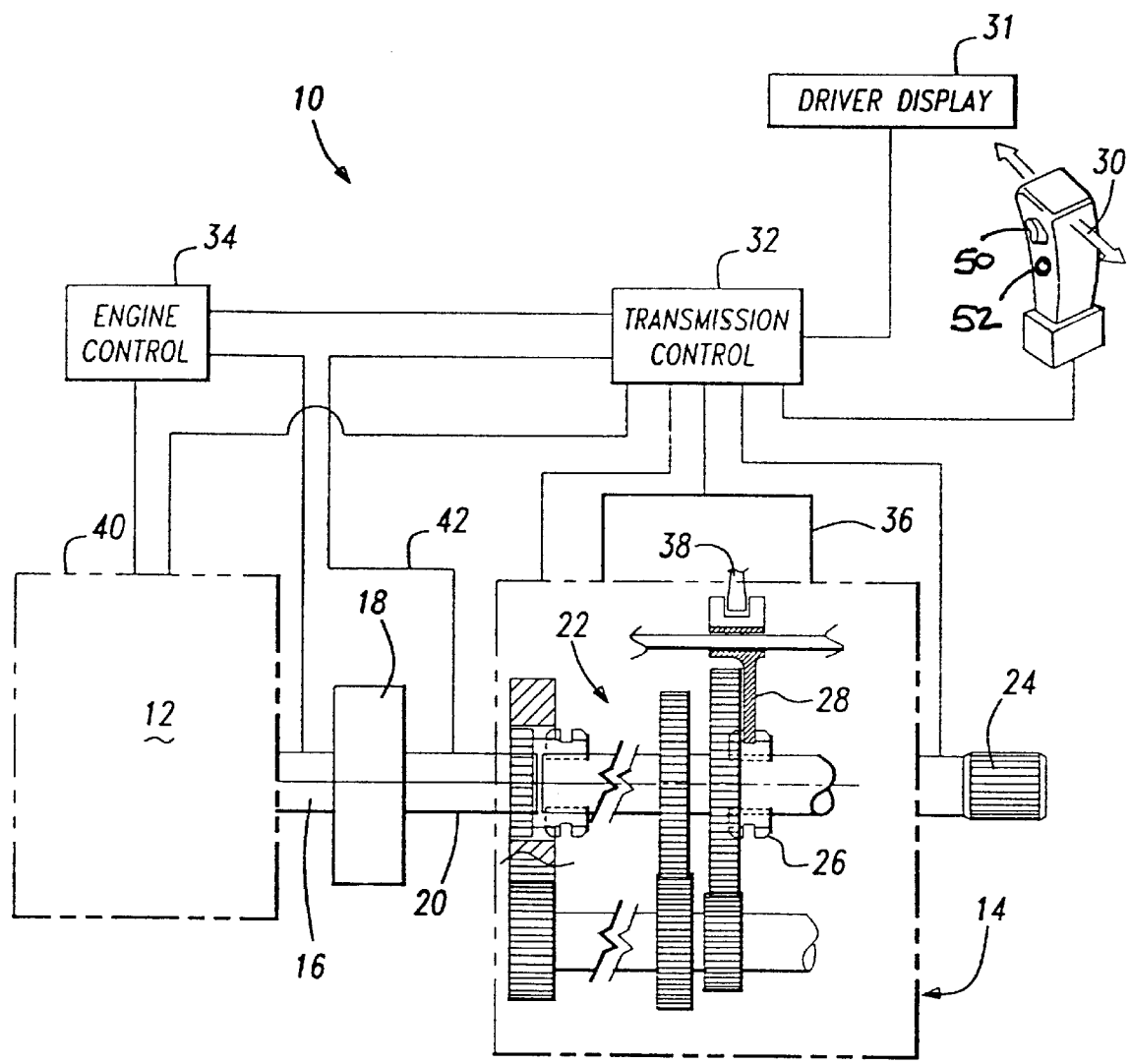

CONTROL METHODS FOR A SHIFT BY WIRE VEHICLE TRANSMISSION

BACKGROUND OF THE INVENTION

This invention generally relates to control methods useful with heavy duty vehicle transmissions that allow a driver to manually select an automatically implemented shift.

Heavy duty vehicles such as trucks typically include a multi-speed transmission that is manually controlled by the driver. The driver utilizes a manual stick shift and clutch to select one of several transmission gears depending upon the driving conditions, for example. The manual stick shift allows the driver to select from the various transmission gears, which vary the ratio between the input speeds of the transmission from the engine and the output speed of the transmission. Conventional shifting operations are typically difficult and cumbersome. They often require a high level of skill from the driver. As trucks have become more complex, the difficulties in shifting the transmission have also increased.

More recently, systems have been proposed to simplify the task of shifting the transmission. Such systems allow a driver to move a shift lever in one of two directions or to push buttons to indicate a desired shift. An electronic controller determines the desired gear ratio and operates an automatic shifting module to change the transmission into the desired gear ratio. Such systems have advantages in that they can simplify the task of driving a heavy duty vehicle.

The nature of a transmission associated with a heavy duty vehicle requires a variety of controlling strategies that must be implemented by the electronic controller to effect appropriate transmission operation. One situation where this is true is providing appropriate feedback to the driver of the vehicle regarding the status or condition of the transmission. This invention includes a method of providing the driver an indication of when the driver needs to take action such as manual clutch operation to ensure that the transmission is engaged into a desired gear. This invention also addresses the situations where a new gear must be engaged after the vehicle has been stopped or was coasting.

SUMMARY OF THE INVENTION

This invention includes methods of controlling a semi-automatic vehicle transmission. The disclosed implementations of the methods of this invention are especially useful for controlling the vehicle transmission after the vehicle has been stopped or has been coasting.

The various features and advantages of this invention will become apparent to those skilled in the art from the following detailed description of the preferred embodiment. The drawings that accompany the detailed description can be described as follows.

BRIEF DESCRIPTION OF THE DRAWINGS

The FIGURE is a schematic illustration of a vehicle transmission assembly designed according to this invention.

DETAILED DESCRIPTION OF THE PREFERRED EMBODIMENT

The FIGURE schematically illustrates a transmission assembly 10. The vehicle engine 12 and the transmission 14 include conventional components unless otherwise indicated. An engine output shaft 16 is connected through a master clutch 18, which is manually operable, to a transmission input shaft 20. When the clutch 18 is open, any rotation of the engine output shaft 16 is not transferred to the transmission input shaft 20. When the clutch 18 is closed, the shafts 16 and 20 are coupled together to rotate generally in unison.

As the transmission input shaft 20 rotates, a gearing arrangement 22 provides a desired driving torque through a transmission output shaft 24. The various gears of the transmission 14 are engaged by moving collars such as the collar 26 through a yoke 28 along conventional shift rails to engage the various gears.

The vehicle operator or driver chooses a desired gear by moving a shift lever 30 in a generally forward or rearward direction. Moving the shift lever 30 in one direction preferably indicates a desire to shift up one gear while moving the lever in an opposite direction indicates a desire to shift down one gear. For purposes of illustration, moving the lever forward indicates a desire to upshift and pulling the lever back indicates a desire to downshift.

The assembly 10 also includes a driver display 31 that communicates the status and operation of the transmission to the driver. The driver display preferably includes such information as a currently engaged gear, and whether the transmission can be shifted upward or downward, for example. The preferred display information will be described in context in the following description.

The transmission assembly 10 is semi-automatic in that the driver selects a desired gear by moving the shift lever 30. The assembly 10 then automatically accomplishes that desired shift provided that vehicle operating conditions allow the shift to be accomplished. If the desired shift is not feasible (i.e., the driver tries to upshift from the highest available gear), the display 31 provides a visible indication that the desired shift will not be completed. An audible signal preferably accompanies the visible signal. A transmission control unit 32 and an engine control unit 34 are implemented through conventional microprocessors, for example. Although the transmission control unit 32 and the engine control unit 34 are illustrated separately in the FIGURE, they could be accomplished through a single control module. The transmission control unit 32 receives signals from the shift lever 30 that indicate a desired gear. After determining that conditions are appropriate to effect a desired change, the transmission control unit 32 causes a shifting module 36 to move a moving member 38, which protrudes through the housing of the transmission 14, to move the yoke 28 according to the desired gear change. More details regarding the preferred operation of the transmission control unit 32 and the manner of effecting a desired shift can be found in the U.S. patent application that was filed on May 20, 1996, which has Ser. No. 08/650,749. The teachings of that application are incorporated into this specification by reference.

A typical shifting operation while the vehicle is in motion begins with the driver determining that an upshift or a downshift is required or desirable. The driver moves the shift lever 30 in the direction indicating the desired shift. The controller 32 receives the shift request signal and begins the shifting procedure. The controller 32 communicates with the engine control 34 to cause the engine 12 to be driven in a known manner to a speed that results in zero torque between the engine output shaft 16 and the transmission input shaft 20. Once zero torque conditions are achieved, the shift actuator 36 causes the transmission 14 to be moved out of the currently engaged gear into neutral. The controller 32 then communicates with the engine control 34 to cause the engine 12 to be driven to a synchronization speed in a known manner so that the selected gear can be engaged. Under synchronous conditions, the shift actuator 36 is commanded to move the transmission 14 into the selected gear. Once the selected gear is engaged, engine control is returned to the driver of the vehicle to continue driving.

A variety of vehicle conditions must be accommodated if the driver is to achieve desired vehicle operation. Example conditions that require special considerations include starting the vehicle after it has been stopped and engaging a gear after the vehicle has been coasting.

When a driver desires to move the vehicle after it has been at rest, it is necessary to manually operate the clutch 18. In one example embodiment, a specific, dedicated clutch sensor is provided that monitors the position of the clutch pedal to determine whether the clutch is in an open or closed position. The preferred embodiment of this invention determines the status of the clutch by utilizing information that is already available and necessary for other portions of the transmission control. The transmission control unit 32 and the engine control unit 34 utilize information regarding the rotational speeds of the engine output shaft 16 and the transmission input shaft 20. Sensors are schematically illustrated at 40 and 42 for providing the speed information regarding those shafts.

This invention preferably includes the method that is disclosed in the copending U.S. patent application having Ser. No. 08/988,465, which was filed on Dec. 10, 1997. The teachings of that application are incorporated into this specification by reference.

One of the features of this invention includes automatically selecting a starting gear. In one example, the default starting gear is second gear. Under normal operating conditions, the transmission controller 32 preferably causes the transmission 14 to be engaged in second gear automatically after the driver indicates a desire to move the vehicle from a stop condition by first moving the lever 30 and subsequently manually operating the clutch 18.

The preferred embodiment of this invention includes the ability for the driver to override the automatic selection of a default gear. In the embodiment where second gear is the default gear, the driver simply moves the lever 30 once in a forward direction to allow the system to engage the default gear. The driver moves the lever 30 twice in the forward direction before manually operating the clutch 18 to start the vehicle in third gear. The transmission 14 preferably is moved directly into third gear from neutral under these conditions. In other words, the system does not move the transmission 14 into the default second gear and then subsequently into third gear, but rather, preferably moves the transmission 14 directly into third gear.

When the driver desires to start the vehicle in first gear, the driver simply moves the lever 30 forward once while depressing the function button 50. The transmission control 32 interprets this action by the driver as a request to begin moving the vehicle in first gear. Accordingly, first gear will be directly engaged once the driver manually operates the clutch 18. Again, the system preferably does not move the transmission into the default second gear followed by moving it into first gear, but rather moves ihe transmission 14 directly into first gear.

Similarly, if the driver desires to begin moving the vehicle in reverse, the driver simply depresses the function button 50 while pulling the lever 30 back (i.e., toward the driver). This action is interpreted by the transmission controller 32 as a request for reverse gear. Upon manual operation of the clutch 18, the controller 32 causes the shifting module 36 to move the transmission 14 into reverse to begin driving the vehicle.

Of course, there may be embodiments where the default starting gear is not second gear. The just-described control method, however, is similarly applicable although the specific gears and modes of moving the shift lever 30 may be different. Further, it is important to note that the system preferably directly engages third gear or first gear as described above when starting the vehicle from rest condition. Under normal driving conditions, of course, the transmission 14 will be shifted in a sequential manner between first, second and third gears as may be required. In other words, only the gear chosen as the starting gear is directly engaged. Whenever a shift is requested while the vehicle is being driven, the selected gears are engaged sequentially in a gear-by-gear manner as described above.

A related feature associated with this invention is that it provides the ability for a driver to go directly from first gear into reverse and then back into first gear without shifting the transmission 14 into neutral as an intermediate step. Whenever the driver desires to go directly from reverse into first gear, the driver simply holds in the function button 50 while moving the shift lever 30 forward. Similarly, if the driver desires to move the transmission 14 directly from first gear into reverse, simply holding in the function button 50 while moving the shift lever 30 back will be interpreted by the transmission controller 32 as a request to go directly from first gear into reverse. Direct movement from first gear into reverse and from reverse into first gear can be beneficial and simplify the driving task when a driver has to maneuver the vehicle within a parking lot, for example.

The controller 32 preferably is programmed to cause the shift module 36 to move the transmission 14 into neutral automatically when the vehicle is shut down (i.e., the engine 12 is turned off). After the ignition switch is turned off, the controller 32 causes the transmission 14 to be placed into neutral and then the controller 32 cuts itself off from the vehicle electrical power supply (not illustrated). Automatically moving the transmission 14 into neutral upon vehicle shut down, while advantageous in some circumstances, may not always be desired. Therefore, the automatic selection of neutral upon vehicle shut down can be overridden by the driver. The system 10 preferably includes a control switch such as the function button 50 to indicate a desire to override this feature. If the driver desires to leave the transmission in gear while parking the vehicle to avoid having the vehicle roll, for example, the driver simply depresses the button 50 and manipulates the shift lever 30 while turning off the engine. The transmission control unit 32 will interpret this signal (or other appropriate signal) from the driver as a request to override the automatic selection of neutral after the vehicle is shut down.

Another feature of this invention is to automatically move the transmission 14 into neutral whenever the ignition is activated. In other words, each time that the vehicle is restarted after being turned off, the transmission controller 32 automatically causes the transmission 14 to be moved into neutral and then awaits the driver's selection of a starting gear as described above.

In some instances, the driver would like the vehicle to coast. According to this invention that can be accomplished in one of two ways. First, the driver could manually operate the clutch while the vehicle is moving. Secondly, the driver can depress the neutral button 52 while the vehicle is moving and the transmission controller 32 will responsively cause the transmission 14 to be moved into neutral.

When the neutral button 52 is utilized, it is necessary to implement a break torque function. Break torque functions and algorithms are known and any suitable automated algorithm can be implemented with this invention. The preferred embodiment of this invention includes predicting the zero torque load and sending a request to the engine controller 34 to achieve that zero torque value. Some dithering preferably is provided only when the zero torque load value is approached. The preferred dithering algorithm utilized with this invention is disclosed in the U.S. patent application having Ser. No. 08/955,842, which was filed on Oct. 21, 1997. The disclosure of that application is incorporated into this specification by reference.

After the vehicle has been moved into neutral and the driver later desires to cease coasting, this invention includes the ability to choose the best available gear to continue driving the vehicle. If the driver moves the shift lever 30 forward to indicate a desire to leave neutral and cease coasting, the controller 32 will automatically choose the best available gear for the current speed of the vehicle. An upshift after neutral preferably results in a move to a gear with the least number of engine rotations per minute acceptable for the vehicle speed. In the preferred embodiment, the best available gear when the lever 30 is moved forward is considered to be the gear that provides an engine speed that is slightly below the engine speed at the peak torque value. This allows for the system to achieve best fuel economy. Under circumstances where no gear is proper for the current vehicle speed (i.e., the truck is moving too fast) no gear will be engaged until the vehicle speed is reduced to a point where a gear is feasible.

When coasting, if the driver moves the shift lever 30 back, the system controller 32 attempts to move the transmission 14 into the gear associated with the highest engine rotations per minute acceptable for the current vehicle speed. When the shift lever 30 is pulled back, while in neutral, the best available gear is considered to be the one that provides an engine speed that is slightly above the engine speed at the peak torque value. This is believed to provide better engine performance under the current vehicle speed conditions.

Determining the peak torque value preferably is accomplished by monitoring a peak torque curve that is dependent upon the particular engine, transmission and current vehicle operating conditions. The transmission controller 32 preferably is programmed to automatically monitor the peak torque curve based upon information from the engine controller 34 and automatically determine which gear is the best available gear depending on whether the torque should be just above or below the peak torque curve.

The other circumstance where a driver can cause the vehicle to coast is by manually operating the clutch 18 while the vehicle is moving. While the driver maintains manual control over the clutch 18, the system controller 32 preferably does nothing. Alternatively, the system controller 32 automatically moves the transmission 14 into neutral when the driver manually operates the clutch 18 to allow the vehicle to coast.

The preceding description is by way of example rather than limiting in nature. Variations and modifications to the disclosed embodiment may become apparent to those skilled in the art that do not necessarily depart from the purview and spirit of this invention. Accordingly, the legal scope of protection given this invention can only be determined by studying the following claims.

I claim:

1. A method of controlling a vehicle transmission system, comprising the steps of:

(A) determining that the vehicle is at rest;

(B) determining that a vehicle operator desires to drive the vehicle;

(C) determining whether a vehicle operator has provided a signal indicating a desired starting gear;

(D) moving the vehicle transmission into the desired starting gear when the signal of step (C) has been provided and (E) moving the vehicle transmission into a preset default starting gear that does not change when the signal of step (C) has not been provided.

2. The method of claim 1, wherein the vehicle transmission system includes a shift lever that is moveable to generate signals indicating an operator's intentions and wherein step (B) is includes determining when the vehicle operator moves the shift lever while the vehicle is at rest.

3. The method of claim 2, wherein step (C) includes determining how many times the vehicle operator has moved the shift lever in a first direction.

4. The method of claim 3, wherein step (D) includes moving the vehicle transmission directly from neutral into a gear that is higher than the default starting gear when the vehicle operator has moved the shift lever in a first direction twice within a preselected time period.

5. The method of claim 2, wherein the vehicle transmission system further includes a function switch and wherein step (D) includes moving the vehicle transmission directly from neutral into a gear that is lower that the default starting gear when the vehicle operator moves the shift lever in a first direction while simultaneously activating the function switch.

6. The method of claim 5, wherein step (D) includes moving the vehicle transmission directly from neutral into reverse when the operator moves the shift lever in a second direction while simultaneously activating the function switch.

7. The method of claim 1, wherein the vehicle transmission system includes a shift lever that is moveable by the vehicle operator to generate signals indicative of a desired gear and a function switch that is selectively activated to generate control signals and wherein step (C) includes defining a first condition where the vehicle operator has moved the shift lever in a first direction only once within a preselected time period;

defining a second condition where the vehicle operator has moved the shift lever in the first direction more than once within the preselected time period;

defining a third condition where the vehicle operator has moved the shift lever in the first direction simultaneous with activating the function switch; and defining a fourth condition where the vehicle operator has moved the shift lever in a second direction.

8. The method of claim 7, wherein step (E) is performed when the first condition exists.

9. The method of claim 7, wherein step (D) is performed when one of the second, third or fourth conditions exists and wherein step (D) includes moving the transmission directly into a gear that is higher than the default starting gear when the second condition exists;

moving the transmission directly into a gear that is lower than the default starting gear when the third condition exists; and moving the transmission directly into reverse when the fourth condition exists.

10. The method of claim 1, wherein step (D) includes moving the vehicle transmission directly into the desired starting gear.

11. The method of claim 1, wherein step (E) includes moving the vehicle transmission directly into the default starting gear.

12. The method of claim 1, wherein step (D) includes moving the vehicle transmission into the desired starting gear without changing the default starting gear.

13. A vehicle transmission system, comprising:

an engine;

a transmission having a plurality of selectively engagable gears coupled to said engine to be driven by said engine;

a manually operable clutch interposed between said engine and said transmission for selectively coupling said transmission to said engine;

a shift lever that is moveable by a vehicle operator to generator signals indicative of a desired transmission state;

a controller that determines that the vehicle is at rest; interprets a signal generated by the vehicle operator moving said shift lever indicating whether the vehicle operator desires a preset default starting gear that does not change or a different desired starting gear;

determines a desired starting gear from said generated signal; and an actuator that is responsive to said controller and moves the vehicle transmission into the desired starting gear.

14. The system of claim 13, wherein said means for determining a desired starting gear determines said different starting gear from the set of gears consisting of a gear that is higher than said default gear, a gear that is lower than said default gear and reverse.

15. The system of claim 13, further comprising a function switch that is selectively actuated by the vehicle operator to generate a signal and wherein said shift lever is moveable in a first direction to choose said default starting gear, said shift lever is moveable in said first direction more than once within a preselected time period to choose said higher gear, said shift lever is moveable in said first direction while simultaneously actuating said function switch to choose said lower gear and said shift lever is moveable in a second direction to choose said reverse gear.

16. The system of claim 13, wherein the actuator moves the vehicle transmission directly into the desired starting gear.

17. The system of claim 13, wherein the actuator moves the vehicle transmission directly into the different desired starting gear responsive to the generated signal without changing the default starting gear.

18. A method of controlling a vehicle transmission system, comprising the steps of:

(A) determining that the vehicle is at rest;

(B) determining that a vehicle operator desires to drive the vehicle;

(C) determining whether a vehicle operator has provided a signal indicating a desired starting gear;

(D) moving the vehicle transmission into a default starting gear when the signal of step (C) has not been provided; and (E) moving the vehicle transmission into the desired starting gear without changing the default starting gear when the signal of step (C) has been provided.

19. The method of claim 18, including presetting the default starting gear and not allowing a vehicle operator to change the default starting gear.

* * * * *